United States Patent [19]

Costello

[11] Patent Number: 4,860,347
[45] Date of Patent: Aug. 22, 1989

[54] PHONE SCREEN SECURITY SYSTEM

[76] Inventor: Lloyd M. Costello, 1832 N. Baltimore, Tacoma, Wash. 98406

[21] Appl. No.: 230,362

[22] Filed: Aug. 10, 1988

[51] Int. Cl.$^4$ ............................................. H04M 1/66
[52] U.S. Cl. .................................. 379/199; 379/200; 379/188
[58] Field of Search ............... 379/188, 199, 200, 373, 379/374, 375, 194

[56] References Cited

U.S. PATENT DOCUMENTS

| | | | |
|---|---|---|---|
| 4,446,334 | 5/1984 | Groff | 379/188 |
| 4,520,233 | 5/1985 | Smith | 379/85 X |
| 4,578,540 | 3/1986 | Borg et al. | 379/199 X |
| 4,621,334 | 11/1986 | Garcia | 364/550 |
| 4,634,811 | 1/1987 | Curtin et al. | 379/211 |
| 4,674,115 | 6/1987 | Kaleita et al. | 379/201 |
| 4,680,785 | 7/1987 | Akiyama et al. | 379/57 |

Primary Examiner—James L. Dwyer
Attorney, Agent, or Firm—Jerry T. Kearns

[57] ABSTRACT

A phone screen security system for blocking unwanted incoming phone calls and unauthorized outgoing phone calls includes a ringer pick up circuit which is actuated by a conventional ring signal of an incoming call on an outside phone line. The ringer pick up circuit actuates a voice synthesizer which requests a caller to input a security code. The input tone signal is transmitted to a code detect circuit which compares the input signal with a preprogammed security code. A timing circuit is connected to the code detect circuit and the ringer pick up circuit for disconnecting the outside phone line after a predetermined time interval if a correct security code is not detected. If a caller inputs the correct security code, the voice synthesizer is actuated to inform the caller. If an incorrect security code is input, the caller is disconnected. The code detect circuit connects the incoming call to a lines select relay if the correct security code is entered. The line select relay routes the call to the correct inside phone line and includes a ringer circuit for sending a ring signal to the appropriate inside phone line.

1 Claim, 1 Drawing Sheet

PHONE SCREEN SECURITY SYSTEM

BACKGROUND OF THE INVENTION

1. Field of the Invention

The present invention relates to phone security systems, and more particularly pertains to a new and improved phone screen security system for blocking unwanted incoming phone calls and unauthorized outgoing phone calls. The present invention is designed to give an individual the security of an unlisted phone number, without incurring the inconvenience and expense of changing their present phone number. The screening system of the present invention requires a caller to input a security code number before the ringer on the individual's phone is actuated. The system includes a programmable code detect circuit which allows the access code to be easily and repeatedly changed.

2. Description of the Prior Art

Various types of phone security systems are known in the prior art. A typical example of such a phone screen security system is to be found in U.S. Pat. No. 4,520,233, which issued to J. Smith on May 8, 1985. This patent discloses a telephone security system which intercepts and screens incoming calls and directs them to a terminal through a modem. The security system prevents completion of a connection to a terminal equipment unless the incoming call provides a predefined access code and the call is found to have been made from a remote subscriber station to which the predefined access code has been assigned. U.S. Pat. No. 4,621,334, which issued to J. Garcia on Nov. 4, 1986, discloses a personal identification system for verifying whether a particular individual is a member of a group of authorized individuals. The system measures time delays between successive strokes of a keyboard as the individual enters his name. A timing vector is constructed from the time delays and is statistically compared with a stored timing vector derived from the authorized individual. If the timing vectors are statistically similar, the individual will be permitted access. U.S. Pat. No. 4,634,811, which issued to W. Curtin et al on Jan. 6, 1987, discloses a call screening system which enables incoming calls for various telephone extensions to be directed to another telephone extension in the system for screening the calls. U.S. Pat. No. 4,674,115, which issued to D. Kaleita et al on June 16, 1987, discloses a programmable telephone switcher which routes an incoming call to a selected telephone, dependent on pre-established access codes dialled by the caller. The device provides call hold, call forwarding an automatic dialling. The device generates ringer signals for directly energizing the ringer circuits on standard telephones. U.S. Pat. No. 4,680,785, to T. Akiyoma et al which issued on July 14, 1987, discloses a personal signalling communication system wherein a personal identification number is assigned to each telephone user, and an arbitrary person is called via wireless by dialling a corresponding personal calling number.

SUMMARY OF THE INVENTION

The present invention provides an improved phone screen security system. As such, the general purpose of the present invention, which will be described subsequently in greater detail, is to provide a new and improved phone screen security system which has all the advantages of the prior art phone security systems and none of the disadvantages.

To attain this, a representative embodiment of the concepts of the present invention is illustrated in the drawings and makes use of a phone screen security system for blocking unwanted incoming phone calls and unauthorized outgoing phone calls which includes a ringer pick up circuit actuated by a conventional ring signal of an incoming call on an outside phone line. The ringer pick up circuit actuates a voice synthesizer which requests a caller to input a security code. The input tone signal is transmitted to a code detect circuit which compares the input signal with a preprogrammed security code. A timing circuit is connected to the code detect circuit and the ringer pick up circuit for disconnecting the outside phone line after a predetermined time interval if a correct security code is not detected. If a caller inputs the correct security code the voice synthesizer is actuated to inform the caller. If an incorrect security code is input, the caller is disconnected. The code detect circuit connects the incoming call to a line select relay if the correct security code is entered. The line select relay routes the call to the correct inside phone line and includes a ringer circuit for sending a ring signal to the appropriate inside phone line. A four position switch connected to the line select relay has an OFF position in which the inside phone lines are connected directly to the outside phone line, an AUTO position in which the inside phone lines are connected to the ringer pick up circuit and bypass the code detect circuit, a CODE position in which the inside phone lines are connected to the code detect circuit and a correct security code must be input to access the outside phone line, and a PROGRAM position which connects the inside phone lines for programming respective security codes into the programmable code detect circuit.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved phone screen security system which has all the advantages of the prior art phone security systems and none of the disadvantages.

It is another object of the present invention to provide a new and improved phone screen security system which may be easily and efficiently manufactured and marketed.

It is a further object of the present invention to provide a new and improved phone screen security system which is of a durable and reliable construction.

An even further object of the present invention is to provide a new and improved phone screen security system which is susceptible of a low cost of manufacture with regard to both materials and labor, and which accordingly is then susceptible of low prices of sale to the consuming public, thereby making such phone security systems economically available to the buying public.

Still yet another object of the present invention is to provide a new and improved phone screen security system which provides in the apparatuses and methods of the prior art some of the advantages thereof, while simultaneously overcoming some of the disadvantages normally associated therewith.

Still another object of the present invention is to provide a new and improved phone screen security system for blocking unwanted incoming phone calls and unauthorized outgoing phone calls.

Yet another object of the present invention is to provide a new and improved phone screen security system which includes a voice synthesizer actuated by a ringer pick up circuit for instructing a caller to input a predetermined security code.

Even still another object of the present invention is to provide a new and improved phone screen security system which has user selectable modes of operation for allowing outgoing calls to be directly dialled on inside phone lines or requiring entry of a predetermined security code before connection of inside phone lines to an outside phone line.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention Will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
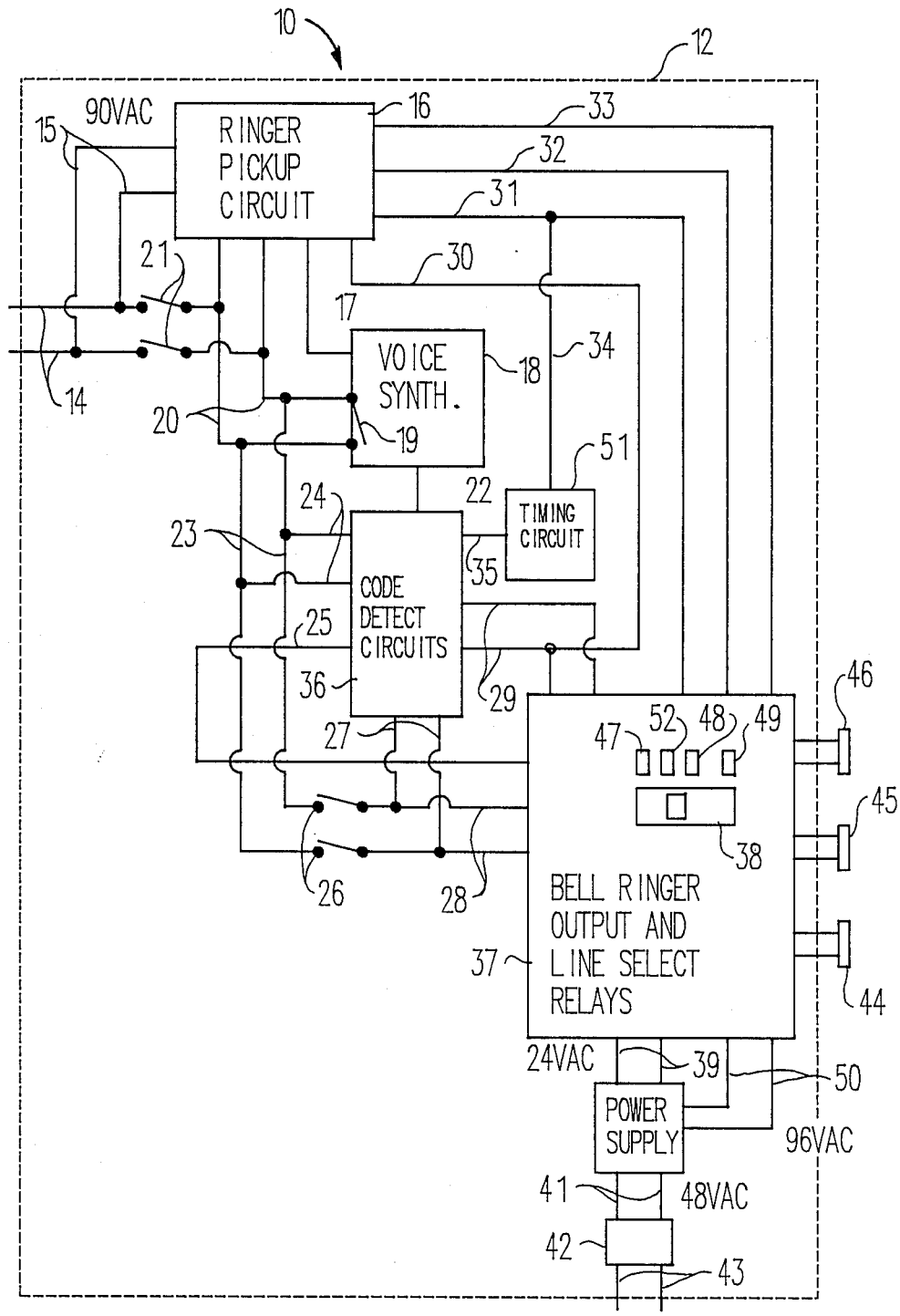
FIG. 1 is a circuit diagram illustrating the construction of the phone screen security system according to the present invention.

With reference now to the drawings, and in particular to FIG. 1 thereof, a new and improved phone screen security system embodying the principles and concepts of the present invention and generally designated by the reference numeral 10 will be described.

More specifically, it will be noted that the first embodiment 10 of the invention includes a housing 12 which has a connection 14 for connection with an outside phone line. The outside phone line is connected by lines 15 to a ringer pick up circuit 16. The ringer pick up circuit 16 is actuated by the 90 VAC ring signal transmitted in a conventional form from the outside phone line to the connection 14. The ringer pick up circuit closes relay contacts 21 which connect the outside phone lines to a voice synthesizer 18. The ringer pick up circuit 16 also sends a trip signal via line 17 to the voice synthesizer 18. The voice synthesizer 18 is actuated by this signal to close the contact 19 and to transmit a digital voice message to the caller on the outside phone line. The synthetic voice message instructs the caller to input the correct security code. The caller then utilizes a conventional touch tone keypad to transmit a tone signal security code via lines 23 to tone decoder inputs 24 of a code detect circuit 36. The code detect circuit 36 compares the input tone signal to a preprogrammed security code. The code detect circuit 36 is connected by a reset trip line to a timing circuit 51. If the correct security code is not entered by the caller within a predetermined time interval, the timing circuit 51 outputs a disconnect signal via line 34 to the ringer pick up circuit disconnect input line 31. The ringer pick up circuit 16 then opens relay contacts 21, thus disconnecting the outside phone line 14 and hanging up on the caller. If the correct security code tone signal is detected by the code detect circuit 36 within the predetermined time interval, the code detect relay outputs 27 close contacts 26, thus connecting the outside phone line 14 to the inputs 28 of a bell ringer output and line select relays 37. The line select relays route the incoming call to an appropriate one of a plurality of inside phone lines 44, 45 and 46. A conventional 96 VAC ring signal is also transmitted to the appropriate inside phone line. The housing 12 includes a connection 43 for connection with a conventional source of 120 VAC. A step down transformer 42 reduces the 120 VAC to 48 VAC input to a power supply 40. The power supply 40 produces a 24 VDC output 39 to the line select relays and to the rest of the circuit components of the device. The power supply 40 also produces a 96 VAC ring signal input on lines 50 to the bell ringer output section of the circuit component 37. A four position switch 38 is provided on the line select relay 37 and has an OFF position in which the inside phone lines 44, 45 and 46 are connected directly to the outside phone line 14. The switch 38 has a CODE position 48 in which the inside phone lines 44, 45 and 46 are connected to the code detect circuit 36 via line 25 and a correct security code must be input to access the outside phone line 14. The switch 38 has a PROGRAM position 52 which connects the inside phone lines 44, 45 and 46 to programmable memory inputs 29 of the code detect circuit 36 for programming respective security codes for each of the inside lines into the programmable code detect circuit 36. The switch 38 has an AUTO position in which the inside phone lines 44, 45 and 46 are connected directly to the ringer pick up circuit 16 via lines 32 and 33. This allows outgoing phone calls to access the outside phone line 14 without input of a security code.

While illustrated with line select relays for three internal phone lines 44, 45 and 46, it is to be understood that the device may be designed for use with a single residential phone line by omitting the line select relay circuitry.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the U.S. is as follows;

1. A phone screen security system for blocking unwanted incoming phone calls and unauthorized outgoing phone calls, comprising:

a housing;

outside connection means in said housing for connection with an outside phone line;

pick up circuit means in said housing for detecting a ring signal on said outside phone line;

voice synthesizer means in said housing for requesting a security code input from a caller on said outside phone line;

relay means actuated by said pick up circuit means for connecting said voice synthesizer means to said outside phone line;

programmable code detect means for comparing a tone signal from said outside phone line with a programmed security code;

said code detect means actuated by said voice synthesizer means;

timing circuit means connected to said code detect means and said pick up circuit means for disconnecting said outside phone line after a predetermined time interval if a correct security code is not detected;

said code detect means actuating said voice synthesizer means to inform a caller of a correct security code input;

line select relay means connected to a plurality of inside phone lines;

relay means activated by said code detect means for connecting said outside phone line to said line select relay means;

ringer means for sending a ring signal to one of said plurality of said inside phone lines;

a power connection on said housing for connection with a conventional source of 120 VAC;

transformer means in said housing for reducing said 120 VAC to 48 VAC;

power supply means in said housing for dividing said 48 VAC into 24 VDC supply to said line select relay means and 96 VAC to said ringer means;

a four position switch connected to said line select relay means;

said switch having an OFF position in which said inside phone lines are connected to said outside phone lines;

said switch having an AUTO position in which said inside phone lines are connected to said pick up circuit means and bypass said code detect means;

said switch having a CODE position in which said inside phone lines are connected to said code detect means and a correct security code must be input to access said outside phone line; and said switch having a PROGRAM position which connects said inside phone lines for programming respective security codes into said programmable code detect means.

* * * * *